(12) United States Patent
Tenzer

(10) Patent No.: US 7,718,916 B2
(45) Date of Patent: *May 18, 2010

(54) LOW IMPACT SPOT WELDING CYLINDER USING DUAL PISTONS

(75) Inventor: Peter Tenzer, Tecumseh (CA)

(73) Assignee: Doben Limited, Windsor (CA)

( * ) Notice: Subject to any disclaimer, the term of this patent is extended or adjusted under 35 U.S.C. 154(b) by 1042 days.

This patent is subject to a terminal disclaimer.

(21) Appl. No.: 11/297,915

(22) Filed: Dec. 9, 2005

(65) Prior Publication Data

US 2006/0124606 A1 Jun. 15, 2006

Related U.S. Application Data

(60) Provisional application No. 60/635,086, filed on Dec. 10, 2004.

(51) Int. Cl.
B23K 9/23 (2006.01)

(52) U.S. Cl. .......................... 219/89; 219/91.2; 91/420

(58) Field of Classification Search ............... 219/89, 219/91.2, 121.53, 124.01, 145.1; 92/13.1
See application file for complete search history.

(56) References Cited

U.S. PATENT DOCUMENTS

| | | | |
|---|---|---|---|
| 4,135,076 A | 1/1979 | Beneteau | |
| 4,296,679 A | 10/1981 | Mattsson | |
| 4,700,611 A | 10/1987 | Kaneko | |
| 5,177,337 A | 1/1993 | Ward | |
| 5,275,540 A | 1/1994 | Brown | |
| 5,623,861 A | 4/1997 | Ward et al. | |
| 5,789,719 A * | 8/1998 | Pary et al. | 219/86.25 |
| 5,796,067 A * | 8/1998 | Enyedy et al. | 219/121.52 |
| 6,054,669 A * | 4/2000 | Warren, Jr. | 219/121.39 |
| 6,528,948 B1 * | 3/2003 | Hershcovitch et al. | 315/111.71 |
| 6,722,257 B2 | 4/2004 | Yoh et al. | |
| 7,214,902 B2 * | 5/2007 | Vanderzwet | 219/89 |

(Continued)

FOREIGN PATENT DOCUMENTS

EP 1398105 A1 3/2004

(Continued)

OTHER PUBLICATIONS

U.S. Patent Application: "Low Impact Spot Welding Cylinder Using Single Piston", filed Dec. 9, 2005.

(Continued)

*Primary Examiner*—Tu B Hoang
*Assistant Examiner*—Brian Jennison
(74) *Attorney, Agent, or Firm*—Carlson, Gaskey & Olds, P.C.

(57) ABSTRACT

A weld cylinder having a dual piston arrangement is provided. The cylinder has a movable retract piston assembly with the piston arranged within the retract piston assembly. The piston supports a rod that is movable between home, intermediate, work, and advanced work positions. The rod moves rapidly from the home position to the intermediate position however, the rod moves more slowly from the intermediate position to the work position to reduce the impact force. A cushion chamber slowly exhausts through a hole in the cushion valve while an isolator is in an open position. Once the cushion valve opens in response to a weld-forward pressure on the cushion valve, the cushion chamber exhausts rapidly so that weld force increases rapidly to minimize increases in cycle time.

14 Claims, 5 Drawing Sheets

U.S. PATENT DOCUMENTS

| | | |
|---|---|---|
| 2002/0066363 A1 | 6/2002 | Holt et al. |
| 2002/0117051 A1 | 8/2002 | Yoh et al. |
| 2003/0089684 A1 | 5/2003 | Beauregard et al. |

FOREIGN PATENT DOCUMENTS

| | | |
|---|---|---|
| JP | 08-309552 A2 | 11/1996 |

OTHER PUBLICATIONS

U.S. Patent Application: "Low Impact Spot Welding Cylinder With Single Piston", U.S. Appl. No. 11/010,857, filed Dec. 12, 2004.

U.S. Patent Application: "Low Impact Spot Welding Cylinder With Dual Pistons", U.S. Appl. No. 11/010,622, filed Dec. 13, 2004.

PCT Patent Application: "Low Impact Spot Welding Cylinder Using Single or Double Piston", Serial No. PCT/CA2005/001239, filed Aug. 11, 2005.

European Search Report for EP Application No. 05772221.7, Oct. 2, 2008.

International Search Report, Dec. 2, 2005.

* cited by examiner

US 7,718,916 B2

LOW IMPACT SPOT WELDING CYLINDER USING DUAL PISTONS

The application claims priority to U.S. Provisional Application No. 60/635,086 filed Dec. 10, 2004.

BACKGROUND OF THE INVENTION

The present invention relates to a weld gun used in spot welding, and more particularly, the invention relates to either a single or double piston welding cylinder for the weld gun generating a low impact force when the weld gun engages the workpiece to perform a spot weld.

A typical weld gun used in spot welding includes opposing arms each having an electrode that applies current to a workpiece to generate a weld nugget, for example, between two sheets of metal. The electrodes include malleable welding caps typically manufactured from a copper alloy. Repeated impact force between the welding caps and the workpiece plastically deforms the welding caps thereby increasing the wear of the welding caps and reducing the service life, which increases operating cost.

Impact force between the welding caps and workpiece also generates workpiece distortion, which can have detrimental effects on the welding process and quality of the weld.

Several prior art weld cylinders have endeavored to reduce the impact force between the welding caps and workpiece to extend the life of welding caps and reduce workpiece distortion. One approach in the prior art has been to slow the advance of the electrodes toward one another by slowing the movement of the pneumatic cylinder. However, while this approach reduces the impact force it also increases the cycle time for a spot weld, which is undesirable. Another drawback is that typically the greater the retract stroke length, the narrower the low impact region becomes relative to the stroke. This is problematic in that the internal components of the weld cylinder must be customized depending upon the application. A more versatile weld cylinder design would provide common components for a wider variety of applications.

Another approach in the prior art is to utilize external devices or peripheral components such as valves, regulators, restrictors, and/or electrical switches to control the pressure, timing, and rate that the air is supplied to the pneumatic cylinder thereby controlling the impact force. However, the addition of these externals devices may be difficult to integrate with existing weld guns and is also costly since additional components must be added to the welding system. It is desirable to use the current industry pneumatic actuating systems so that the inventive weld cylinder may be used with current systems. For example, in four weld port systems, the ports are typically pressurized in pairs to achieve the three different weld cylinder stroke positions.

Therefore, what is needed is a pneumatic cylinder that reduces impact force between the welding caps and the workpiece but that does not require additional, costly design features or external devices and increases in cycle time.

SUMMARY OF THE INVENTION AND ADVANTAGES

The present provides a weld cylinder having a dual or single piston arrangement. The cylinder has a movable retract piston assembly with the piston arranged within the retract piston assembly. The piston supports a rod that is movable between home, intermediate, work, and fully advanced work positions. The rod moves rapidly from the home position to the intermediate position. However, the rod moves more slowly from the intermediate position to the work position to reduce the impact force. A cushion valve supported by the retract piston assembly and a middle separator block cooperate to increase the rate at which the rod moves from the work position to the advanced position so that weld force increases rapidly to minimize increases in cycle time.

A cushion chamber is pressurized using weld-return air. An isolator valve opens when it engages the middle separator block during the advance of the retract piston assembly. When the isolator moves from closed position to open position, the fluid in the cushion chamber is permitted to slowly escape when moving from the intermediate position to the work position through the vented weld-return port. Thus, the isolator maintains pressure in the cushion chamber until retract-forward position is reached and the isolator is opened. As a result, pressure within the cushion chamber is preserved regardless of the retract stroke of the particular cylinder in which the present invention is being used.

The cushion valve is a differential pressure valve that is exposed to the pressure within the cushion chamber and weld-forward air pressure. As the pressure in the cushion chamber falls as the chamber is exhausted and the weld-forward air pressure rises when moving from the intermediate position to the work position, the cushion valve will open. The opened cushion valve enables the cushion chamber to be exhausted even more rapidly so that the weld force can build quickly.

Accordingly, the present invention provides a pneumatic cylinder that reduces initial impact force between the welding caps and the workpiece, but that does not require additional, costly external devices and increases in cycle time.

These and other features of the present invention can be best understood from the following specification and drawings, the following of which is a brief description.

DETAILED DESCRIPTION OF THE PREFERRED EMBODIMENT

Figure 1:
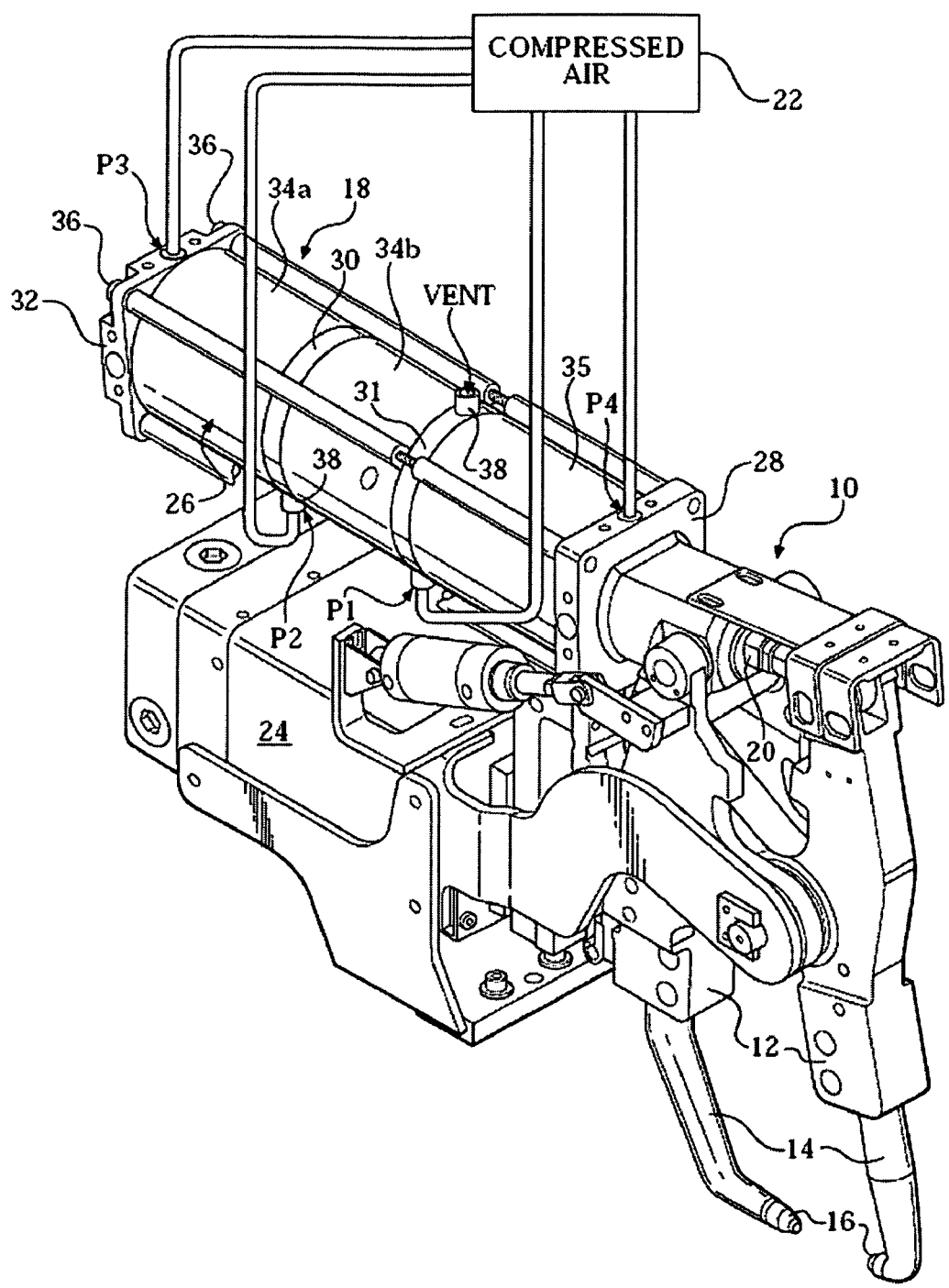
FIG. 1 is a perspective view of an inventive weld gun.

An inventive weld gun 10 including an inventive pneumatic cylinder 18 is shown in FIG. 1. The pneumatic cylinder 18 is a four port arrangement (P1-P4) that can be easily integrated into existing weld guns utilizing four ports. That is, the plumbing for prior art weld guns having four ports can be used with the inventive pneumatic cylinder 18 without modification to the welding system. The ports P1-P4 are fluidly connected to a compressed air source 22. The ports P1-P4 are connected to the compressed air source 22 though valves that control the timing of the air signals provided to the pneumatic cylinder 18 by selectively opening and closing the valves.

The weld gun 10 includes opposing arms 12 that each include an electrode 14. The electrodes 14 include welding caps 16 that are typically manufactured from a malleable copper alloy. The welding caps 16 engage a workpiece (not shown) to apply a welding current to the workpiece to generate a weld nugget, as is well known in the art. The arms 12 are typically supported by the weld gun 10 and interconnected to one another at various pivot points. A rod 20 of the pneumatic cylinder 18 is typically connected to one of the arms 12 to actuate the electrodes 14 and welding cap 16 between electrode positions corresponding to home (fully returned), intermediate, and work (caps 16 and workpiece engaged) positions. Current is applied to the electrodes 14 when in the work position using a current source 24 that is electrically connected to the electrodes 14.

Port P1 provides weld-forward air when pressurized. Port P2 provides weld-return air when pressurized. Port P3 provides retract-forward air when pressurized, and port P4 provides retract-return air when pressurized. Typically, the ports are pressurized in pairs to achieve a desired position with the other, non-pressurized ports vented to atmosphere. In the example shown, the weld-return and retract-return ports, P2 and P4, are pressurized to obtain the home position. The weld-return and retract-forward ports, P2 and P3, are pressurized to obtain the intermediate position. The weld-forward and retract-forward ports, P1 and P3, are pressurized to obtain the work position. The fully advanced work position is the travel limit of the work position. The rod 20 may be actuated between the above three positions or directly from the home position to the work position by actuating the desired valves. It should be understood that the work position is not necessarily a discrete position, but rather, may be any distance along which the rod 20 moves between the intermediate position and the fully advanced work position. The various positions and the condition at the ports is expressed in the following table:

|  | Weld-Forward (P1) | Weld-Return (P2) | Retract-Forward (P3) | Retract-Return (P4) |
| --- | --- | --- | --- | --- |
| Home | vented | pressurized | vented | pressurized |
| Intermediate | vented | pressurized | pressurized | vented |
| Work | pressurized | vented | pressurized | vented |

The pneumatic cylinder 18 includes a cylinder body 26 that has a pair of barrels 34a and 34b with a separator 30 arranged between the barrels 34a and 34b. A port adapter 38 is arranged on the separator 30 to provide the P2 port. An end cap 32 is arranged at one end of the cylinder body 26, and a front block 28 is arranged at the other end of the cylinder body 26. A middle separator block 31 is arranged between the barrel 34b and another barrel 35 that is adjacent the front block 28. Fasteners 36 secure the components of the cylinder body 26 together so the pneumatic cylinder 18 can be pressurized at ports P1-P4 without leakage from the cylinder body 26. It should be understood that the ports may be arranged on the cylinder other than described and shown. For example, the ports may be repositioned to provide desired packaging of the weld cylinder.

The multiple component cylinder body 26 and its configuration described above are exemplary of a four/port pneumatic cylinder having a dual piston arrangement. However, it should be understood that other configurations may be used and still fall within the scope of the present invention. For example, a single cylinder may also incorporate the present invention.

Figure 2:
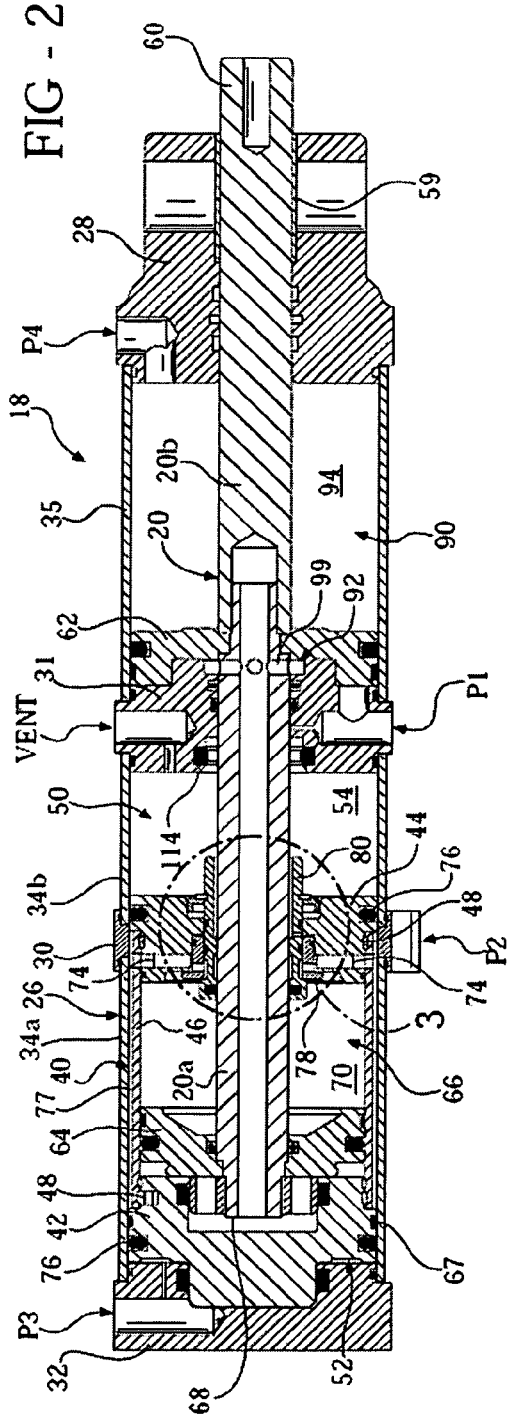
FIG. 2 is a cross-sectional view of a dual piston weld cylinder shown in FIG. 1 in the home position.
Figure 4:
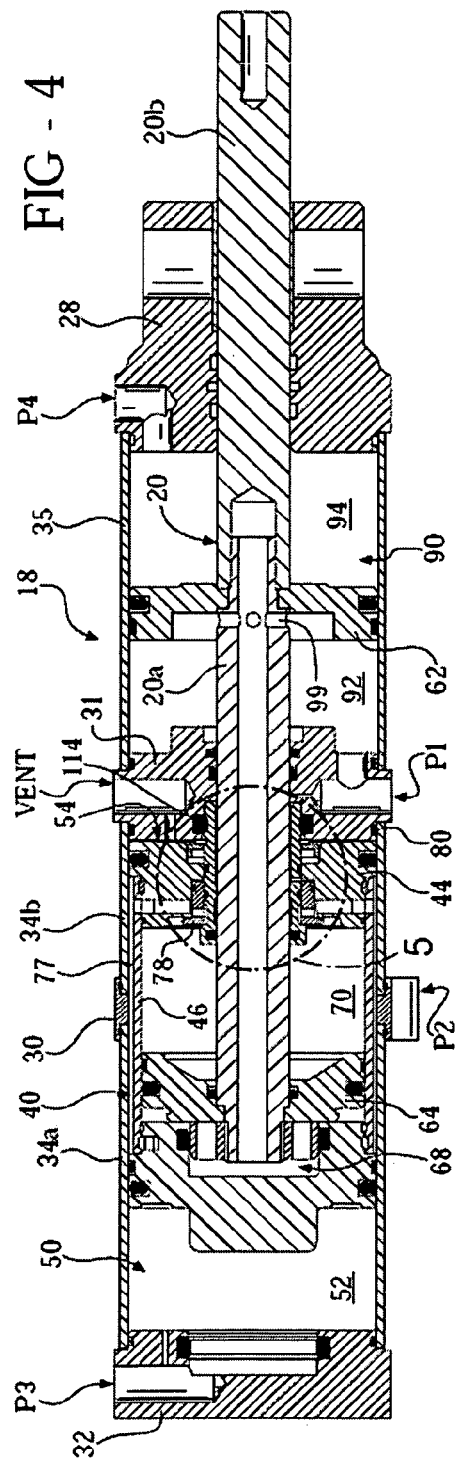
FIG. 4 is a cross-sectional view of the dual piston weld cylinder shown in FIG. 1 in the intermediate position.
Figure 3:
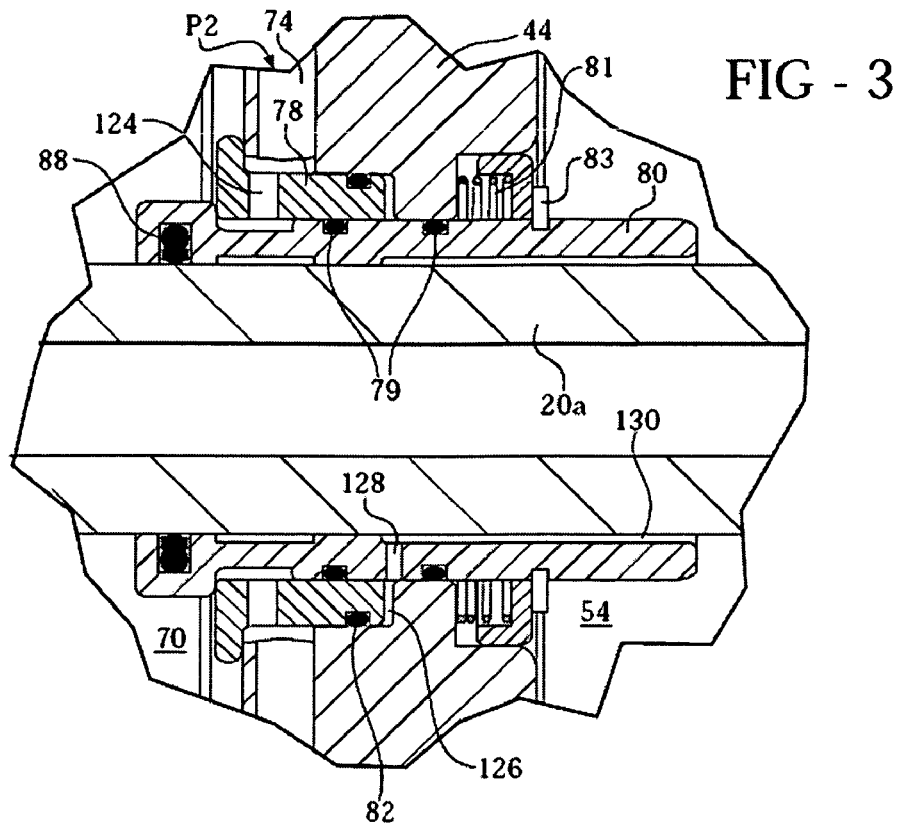
FIG. 3 is an enlarged view of the rearward flange of the retract piston assembly shown in FIG. 2.
Figure 5:
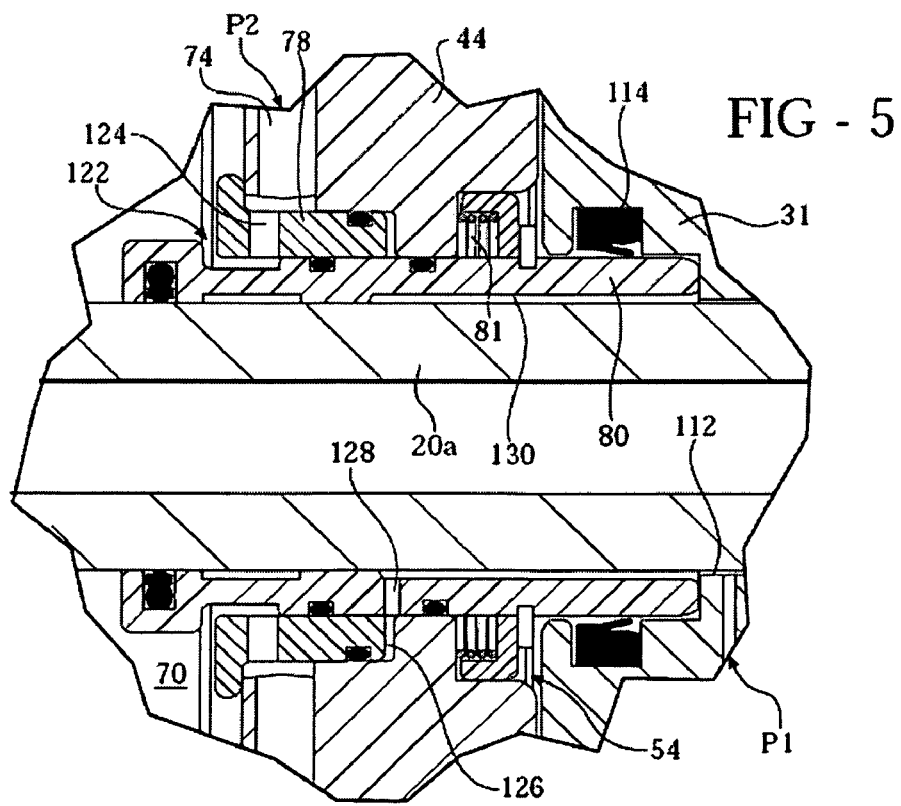
FIG. 5 is an enlarged view of the rearward flange engaging the middle separator block, as shown in FIG. 4.
Figure 6:
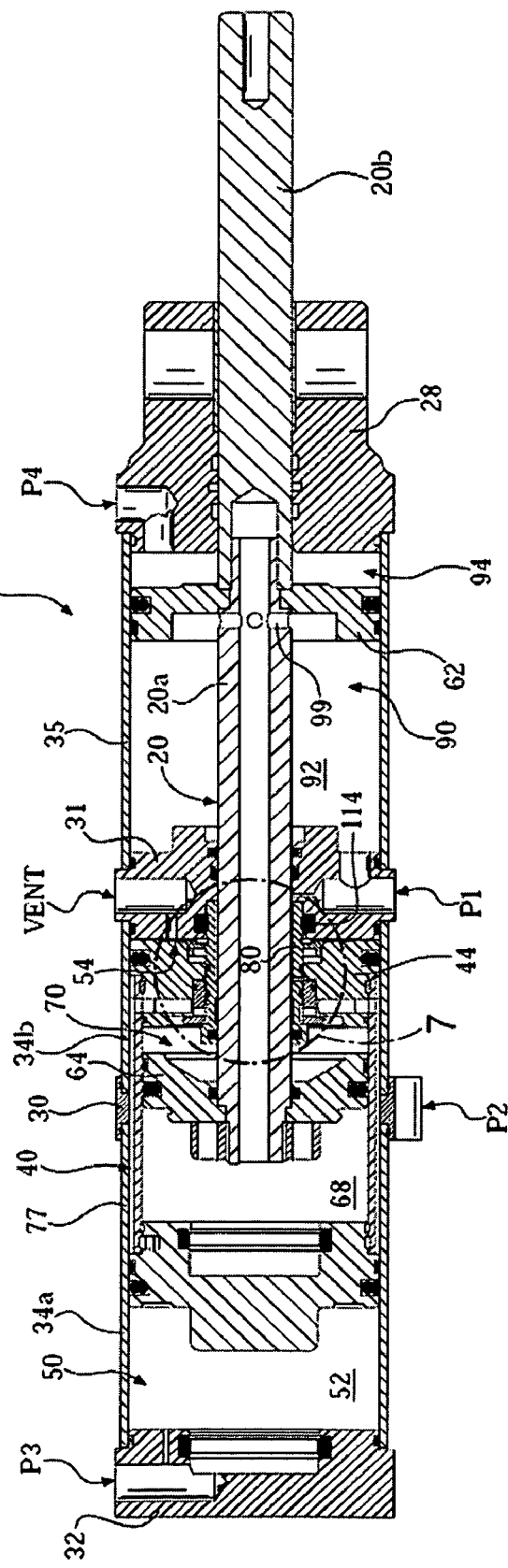
FIG. 6 is a cross-sectional view of the dual piston weld cylinder shown in FIG. 1 in the work position.
Figure 7:
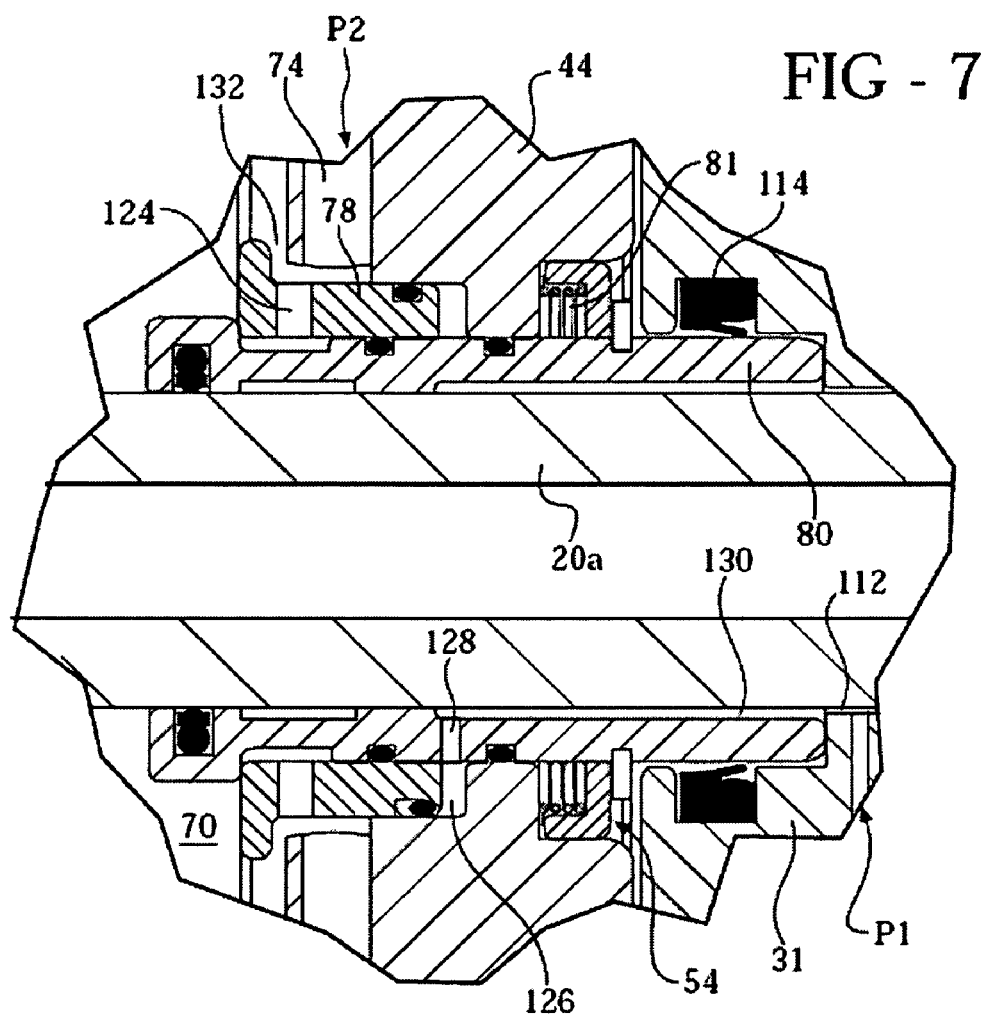
FIG. 7 is an enlarged view of the rearward flange engaging the middle separator block with the cushion valve open, as shown in FIG. 6.

In the example embodiment of the inventive pneumatic cylinder 18, three cylinder positions are generated. FIGS. 2 and 3 depict a home position of the pneumatic cylinder 18. FIGS. 4 and 5 show an intermediate position of the pneumatic cylinder 18, and FIGS. 6 and 7 depict a work position of the pneumatic cylinder 18. The work or weld position may lie anywhere between the intermediate position and the fully advanced position depending on the mechanical system and the workpiece. The weld position may be varied during the welding process to ensure the weld force is maintained as the electrodes deflect under mechanical load, account for electrode wear, and account for workpiece distortion during the welding process. In the fully advanced position, a weld flange 64 is in close proximity to or engages a rearward flange 44.

The present invention pneumatic cylinder 18 moves the rod 20 quickly from the home position (FIG. 2) to the intermediate position (FIG. 4) in which the welding caps 16 are in close proximity to the workpiece. However, the rod 20 moves more slowly from the intermediate position (FIG. 4) to the work position (FIG. 6) in which the welding caps 16 sufficiently forcefully engage the workpiece. The rod 20 moves forward an additional distance to increase the weld force so that current can be applied to produce a weld nugget. The slower movement from the intermediate position (FIG. 4) to the work position (FIG. 6) ensures that the impact force between the welding caps 16 and the workpiece is minimized. However, the preceding, more rapid movement of the rod 20 ensures that cycle time is not unduly compromised. The present invention reduces the impact force of the caps engaging the workpiece while not significantly increasing cycle times. Further, the invention decouples the retract stroke length of a cylinder from low impact performance. That is, the invention can meet desired low impact targets using the same components for cylinders having various retract stroke lengths.

Referring to FIG. 2, ports P1 and P3 are provided by the end cap 32, and port P2 is provided by the separator 30. Port P4 is provided by the front block 28, which also slideably supports the rod 20 with bushing 59. A retract piston assembly 40 is slideably supported by the barrels 34a and 34b. The retract piston assembly 40 includes a barrel 46 having forward and rearward flanges 42 and 44 secured at opposite ends using retaining ribbons 48. The retract piston assembly 40 separates a cavity 50 provided by the barrels 34a and 34b into first and second chambers 52 and 54. The retract piston assembly 40 is shown in a retract-return position in FIG. 2 and a retract-forward position in FIGS. 4 and 6.

The retract piston assembly 40 includes a weld flange 64, which is secured to an end of the rod 20 opposite an end 60 of the rod 20. The end 60 is secured to one of the arms 12. The weld flange 64 is arranged within the retract piston assembly 40 between the forward and rearward flanges 42 and 44 in a cavity 66 that is separated by the weld flange 64 into third and fourth chambers 68 and 70. The fourth chamber 70 acts as a cushion chamber to reduce the impact between the caps and the workpiece.

The rod 20 includes two rod portions 20a and 20b secured about another weld flange 62. The weld flanges 62 and 64 are shown in a weld-return position in FIGS. 2 and 4 and moving toward a weld-forward position in FIG. 6. The work position depicted in FIG. 6 includes a range of positions once the rod 20 begins to move. The rod 20 continues to advance a distance as the pressure builds to allow the weld-force pressure to build quickly.

A wear band 67 is arranged on the forward flange 42 to keep the retract piston assembly 40 centered within the barrels 34a and 34b. An annular space 77 is provided between the barrels 34 and 46. The forward and rearward flanges 42 and 44 each carry a seal 76 that provides a seal between the barrels 34a and 34b and the retract piston assembly 40. A passage 74 in the rearward flange 44 provides a fluid connection between one side of the cushion valve 78 and the weld-return port P2.

The weld flange 62 is arranged in a cavity 90 between the middle separator block 31 and the front block 28. The weld flange 62 divides the cavity into chambers 92 and 94. Chamber 94 is in fluid communication with the retract-return port P4, and chamber 92 is in fluid communication with the weld-forward port P1. A hole 99 in the rod portion 20a fluidly connects the chamber 92 to the third chamber 68 so that pressurized fluid from the weld-forward port P1 will act on both weld flanges 62 and 64.

Referring to FIG. 3, the inventive pneumatic cylinder 18 includes a cushion or differential pressure valve 78 supported by the rearward flange 44 of the retract piston assembly 40. A seal 82 is arranged between the cushion valve 78 and the rearward flange 44.

An isolator 80 is arranged concentrically with and inside of the cushion valve 78. The isolator 80 is sealed against the cushion valve 78 and rearward flange 44 with seals 79. A seal 88 is arranged between the isolator 80 and the rod 20. A spring 81 acts against a retainer 83 that is secured to the isolator 80 to bias the isolator 80 to the closed position shown in FIGS. 2 and 3. The pressure in the cushion chamber 70 and spring 81 apply sufficient force to the isolator 80 to maintain the isolator 80 in the closed position. The spring 81 is optional since the second chamber 54 is not pressurized.

With continuing reference to FIGS. 2 and 3, which depict the home position, the cushion chamber 70 has already been pressurized by weld-return air subsequent to welding the workpiece. Specifically, from the work position shown in FIG. 6, the weld-return port P2 is actuated, i.e. pressurized, (along with the retract-return port P4) to obtain the home position of FIG. 2. The retract-return port P4 provides pressurized air to chamber 94 to retain the retract piston assembly 40 in the retracted position.

The intermediate position is shown in FIGS. 4 and 5 and is achieved by pressurizing the weld-return and retract-forward ports P2 and P3. As the first chamber 52 is pressurized, the second chamber 54 is exhausted through Vent. The isolator 80 engages the middle separator block 31 moving the isolator 80 to the open position, best seen in FIG. 5, and compressing spring 81. An opening 122 is created between the cushion valve 78 and the isolator 80 to fluidly connect the weld-return port P2 to the cushion chamber 70 through the opening 122 and a hole 124 in the cushion valve 78. In the intermediate position, the weld-return port P2 is still pressurized. As a result, the pressure in the cushion chamber 70 is "topped off" prior to actuating the cylinder to the work position.

There is a space 126 between the cushion valve 78 and the rearward flange 44. The isolator 80 includes an aperture 128 that fluidly connects the space 126 to an annular passage 130 arranged between the isolator 80 and the rod portion 20a. A passage 112 arranged between the rod portion 20a and the middle separator block 31 fluidly connects the weld-forward port P1 to the space 126 via the annular passage 130 and aperture 128. The weld-forward port P1 is vented in the intermediate position so that atmospheric pressure acts on the rear of the cushion valve 78. With the cushion chamber 70 pressurized, the cushion valve 78 is maintained in the closed position.

The cylinder is actuated from the intermediate position (FIGS. 4 and 5) to the work position shown in FIGS. 6 and 7 by pressurizing the weld-forward port P1 and the retract-forward port P3. The weld-return port P2 is vented while the cushion chamber 70 and weld-return port P2 are still fluidly connected to one another.

Referring to FIGS. 6 and 7, the pressurized fluid enters the third chamber 68 through the hole 99 in the rod portion 20a that is fluidly connected to the weld-forward port P1. As the pressure rises in the third chamber 68, the weld flange 64 advances, but initially with the cushion valve 78 and isolator 80 in the positions shown in FIG. 5.

With reference to FIG. 5, as the weld flange 64 advances (along with weld flange 62), the air from cushion chamber 70 is exhausted slowly through hole 124 out weld-return port P2 to cushion the contact between the weld caps and the workpiece. The pressure in cushion chamber 70 finally drops to a level at which pressure from the weld-forward port P1 in space 126 overcomes the pressure in cushion chamber 70 and spring 81 to open the cushion valve 78, as shown in FIG. 7. The cushion valve 78 engages the isolator 80 in the open position. In the open position, the air in the cushion chamber 70 is permitted to exhaust rapidly through annular opening 132 out the weld-return port P2 so that welding force can rise rapidly.

The cylinder is actuated to the intermediate position by pressurizing the cushion chamber 70 with air from the weld-return port P2. To move to the home position, the retract-return port P4 is additionally actuated. Ports are pressurized and vented in accordance with the table above. In both positions, the weld flange 64 is moved to the returned position. Once the cushion chamber 70 is filled, the pressure in the cushion chamber 70 will close the cushion valve 78. A "topping up" of pressure in the cushion chamber 70 continues as fluid enters through the hole 124 and past annular opening 122, which is shown in FIG. 5.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A weld cylinder comprising:
    a cylinder supporting a rod providing home, intermediate and work positions, the cylinder including a block separating a pair of barrels each providing a separate cavity;
    a retract piston assembly arranged in the cylinder within one of the cavities and movable between retract-return and retract-forward positions, the retract piston assembly providing a cushion chamber, the retract piston assembly near the block in the retract-forward position;
    a weld flange arranged in the retract piston assembly and movable between weld-return and weld-forward positions, the weld flange supporting the rod;
    a differential pressure valve regulating pressure in the chamber; and
    an isolator valve cooperating with the differential pressure valve to bias the differential pressure valve to a closed position, the isolator valve movable relative to the block and the differential pressure valve and cooperating with the block in the retract-forward position to move the isolator valve from a closed position to an open position, wherein the differential pressure valve and isolator valve and concentric with one another.

2. The weld cylinder according to claim 1, wherein the differential pressure valve and isolator valve are supported by the retract piston assembly.

3. The weld cylinder according to claim 1, wherein a spring urges the isolator valve to the closed position.

4. The weld cylinder according to claim 2, wherein the isolator valve fluidly connect the differential pressure valve to a vented port when moving from the retract-return position to the retract-forward position.

5. The weld cylinder according to claim 4, wherein retract-return, weld-return positions, retract-forward and weld-forward ports are pressurized to provide the corresponding retract-return, weld-return positions, retract-forward and weld-forward positions, wherein the home position corresponds to the retract-return and weld-return positions with the non-corresponding ports vented, the intermediate position corresponds to the retract-forward and weld-return positions with the non-corresponding ports vented, the work position corresponds to the retract-forward and weld-forward positions with the non-corresponding ports vented.

6. The weld cylinder according to claim 5, wherein differential pressure valve is exposed to pressurized fluid when the rod moves from the intermediate position to the work position on a side opposite the cushion chamber with the cushion chamber fluidly connected to a vented port with the isolator valve in the open position.

7. The weld cylinder according to claim 6, wherein fluid in the cushion chamber exhausts at a first rate with the isolator valve in the open position until a force on the differential pressure valve from the cushion chamber falls below the force on the opposite side at which point the differential pressure valve moves from a closed position to an open position with the isolator valve in the open position to exhaust fluid from the cushion chamber at a second rate greater than the first rate.

8. The weld cylinder according to claim 7, wherein the differential valve is axially spaced from the isolator valve during the first rate.

9. The weld cylinder according to claim 7, wherein the differential pressure valve is axially seated against the isolator valve during the second rate.

10. A weld cylinder comprising:
a cylinder supporting a rod providing home, intermediate and work positions, the cylinder including a block having a port;
a retract piston assembly arranged in the cylinder and movable between retract-return and retract-forward positions, the retract piston assembly providing a cushion chamber, the retract piston assembly near the block in the retract-forward position;
a weld flange arranged in the retract piston assembly and movable between weld-return and weld-forward positions, the weld flange supporting the rod;
a differential pressure valve arranged within the cylinder and configured to regulate pressure in the chamber;
an isolator valve arranged within the cylinder and configured to cooperate with the differential pressure valve to bias the differential pressure valve to a closed position, the isolator valve movable relative to the block and the differential pressure valve and cooperating with the block in the retract-forward position to move the isolator valve from a closed position to an open position, wherein the differential pressure valve and isolator valve are concentric with one another; and
wherein the block includes an aperture receiving an end of the isolator valve and a seal arranged between the isolator valve and the block, a passage arranged between the rod and the block fluidly connecting the port to the differential pressure valve with the isolator valve in the open position.

11. The weld cylinder according to claim 10, wherein the isolator valve includes an aperture fluidly interconnecting the passage and the differential pressure valve with the isolator valve in the open position.

12. A weld cylinder comprising:
a cylinder supporting a rod providing home, intermediate and work positions, the cylinder including a block;
a retract piston assembly arranged in the cylinder and movable between retract-return and retract-forward positions, the retract piston assembly providing a cushion chamber, the retract piston assembly near the block in the retract-forward position;
a weld flange arranged in the retract piston assembly and movable between weld-return and weld-forward positions, the weld flange supporting the rod;
a differential pressure valve arranged within the cylinder and configured to regulate pressure in the chamber;
an isolator valve arranged within the cylinder and configured to cooperate with the differential pressure valve to bias the differential pressure valve to a closed position, the isolator valve movable relative to the block and the differential pressure valve and cooperating with the block in the retract-forward position to move the isolator valve from a closed position to an open position, wherein the differential pressure valve and isolator valve are concentric with one another;
wherein the isolator valve fluidly connect the differential pressure valve to a vented port when moving from the retract-return position to the retract-forward position;
wherein retract-return, weld-return positions, retract-forward and weld-forward ports are pressurized to provide the corresponding retract-return, weld-return positions, retract-forward and weld-forward positions, wherein the home position corresponds to the retract-return and weld-return positions with the non-corresponding ports vented, the intermediate position corresponds to the retract-forward and weld-return positions with the non-corresponding ports vented, the work position corresponds to the retract-forward and weld-forward positions with the non-corresponding ports vented;
wherein differential pressure valve is exposed to pressurized fluid when the rod moves from the intermediate position to the work position on a side opposite the cushion chamber with the cushion chamber fluidly connected to a vented port with the isolator valve in the open position; and
wherein fluid in the cushion chamber exhausts at a first rate with the isolator valve in the open position until a force on the differential pressure valve from the cushion chamber falls below the force on the opposite side at which point the differential pressure valve moves from a closed position to an open position with the isolator valve in the open position to exhaust fluid from the cushion chamber at a second rate greater than the first rate.

13. The weld cylinder according to claim 12, wherein the differential valve is axially spaced from the isolator valve during the first rate.

14. The weld cylinder according to claim 13, wherein the differential pressure valve is axially seated against the isolator valve during the second rate.

* * * * *